Inventors
HERBERT FRIEDMAN
LAVERNE S. BIRKS

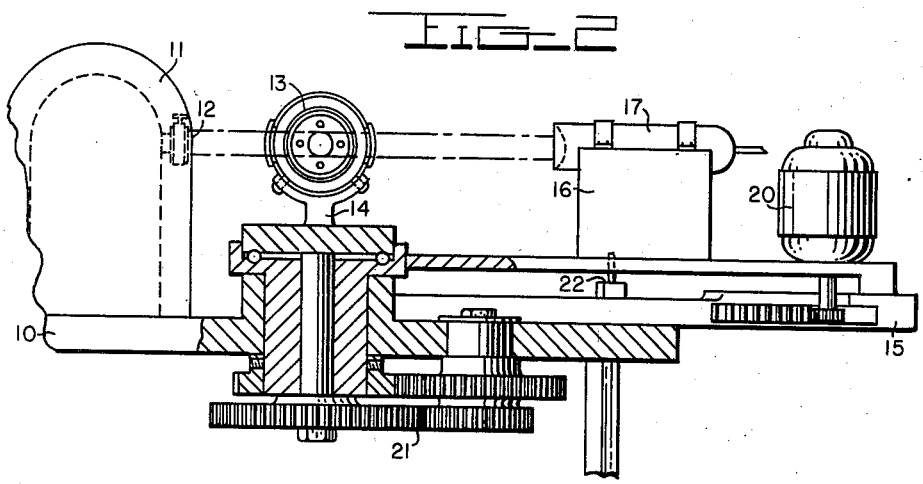
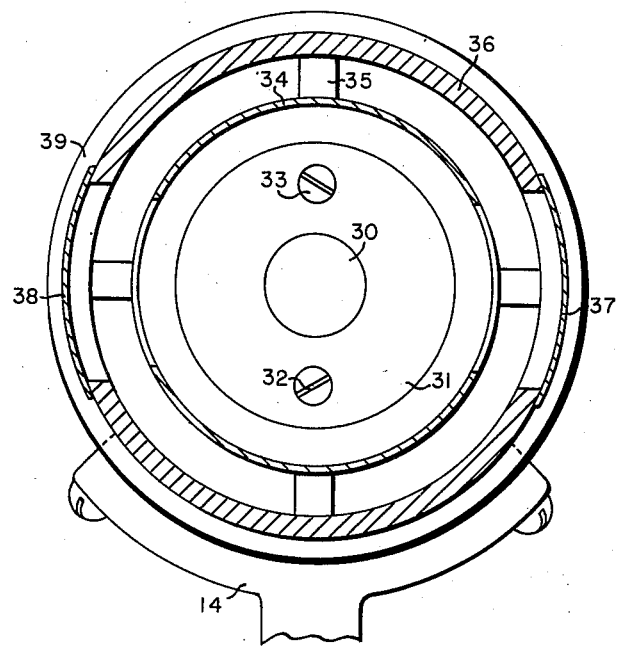

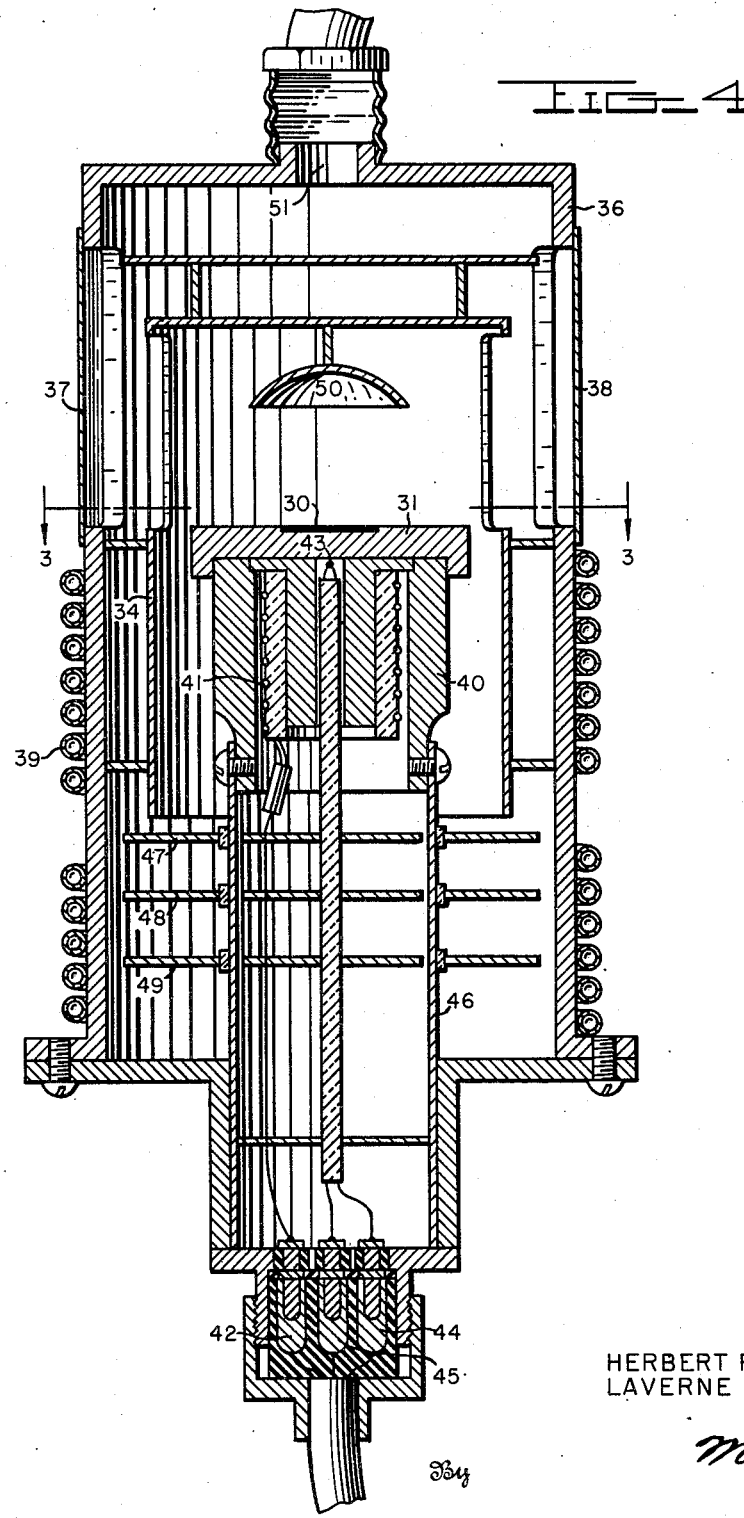

July 11, 1950     H. FRIEDMAN ET AL     2,514,382
HIGH TEMPERATURE DEVICE FOR X-RAY DIFFRACTION
Filed Sept. 23, 1946     4 Sheets-Sheet 4
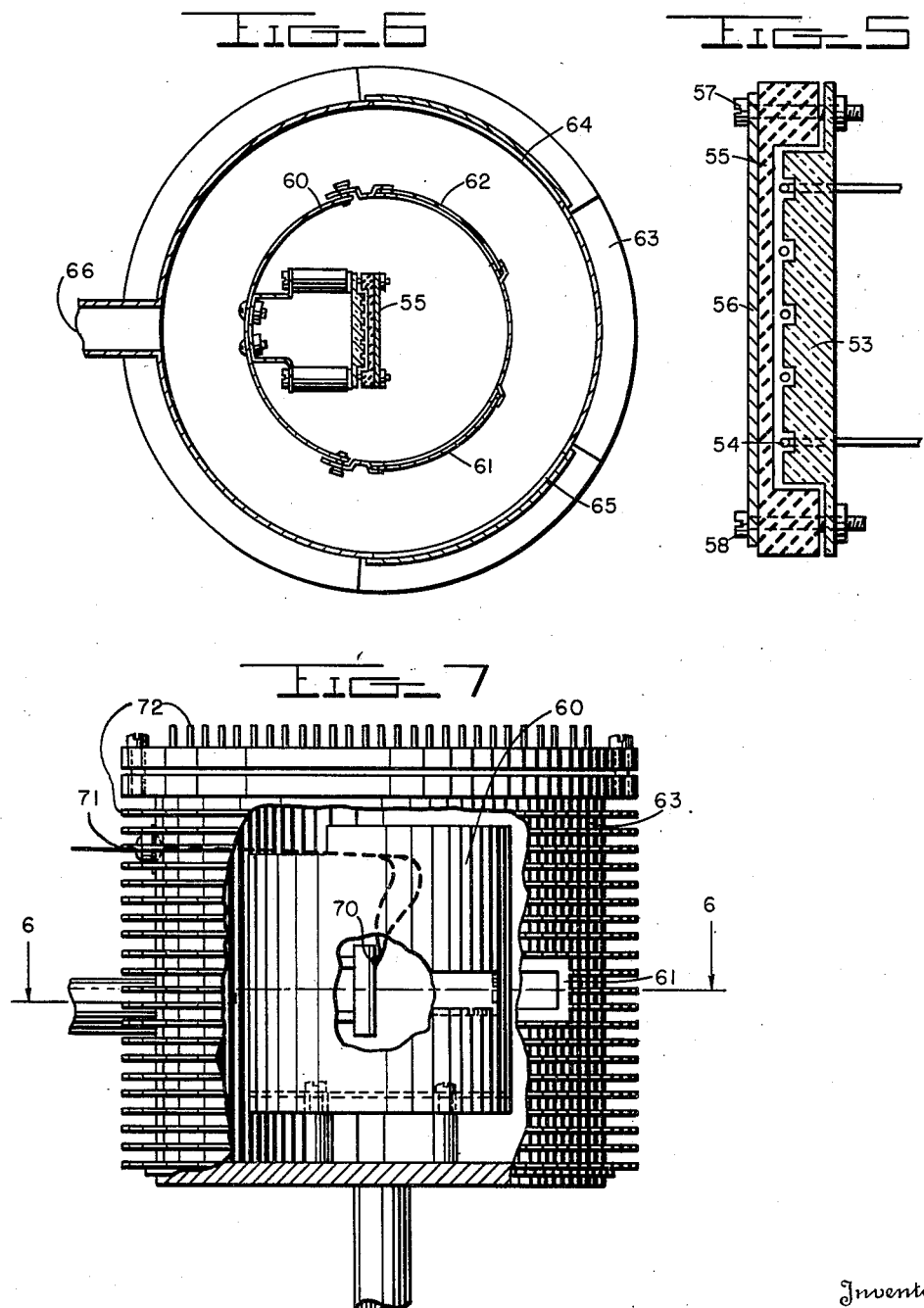
Inventors
HERBERT FRIEDMAN
LAVERNE S. BIRKS
By M. A. Hayes
Attorney Patented July 11, 1950

2,514,382

UNITED STATES PATENT OFFICE 2,514,382

HIGH TEMPERATURE DEVICE FOR X-RAY DIFFRACTION

Herbert Friedman, Arlington, Va., and La Verne S. Birks, Washington, D. C.

Application September 23, 1946, Serial No. 698,597

1 Claim. (Cl. 250—51)

(Granted under the act of March 3, 1883, as amended April 30, 1928; 370 O. G. 757)

Our invention relates to an apparatus for heating to a controlled high temperature a specimen in a diffraction spectrometer.

An object of our invention is to provide a means for heating a specimen to a controllable elevated temperature in an X-ray diffraction apparatus while such a sample is undergoing X-ray spectrometer analysis.

Another object of our invention is to provide a device whereby a heated specimen may be examined while under high vacuum conditions in an X-ray spectrometer.

A further object of our invention is to provide a heating device for an X-ray spectrometer specimen which affords a means whereby the X-rays may strike the specimen and refract therefrom over a wide angular range while the specimen is under reduced pressure and at an elevated temperature.

A still further object of our invention is to provide a vacuum-tight heating device having radiation permeable windows by means of which a specimen therein may be subjected to X-ray spectrometer analysis while raised to a high controllable temperature under high vacuum conditions.

Other and further objects and features of our invention will be apparent from the following specification and drawings.

The technique of X-ray diffraction analysis, in brief, involves subjecting a specimen of a material to a concentrated beam of X-rays and measuring the angles of diffraction and relative intensities of the diffracted radiations which are obtained thereby. Through this technique an X-ray diffraction spectrum is obtained which is characteristic of the particular composition and configuration of the specimen under analysis.

X-ray diffraction analysis provides an important means for studying and observing the characteristics of matter. The molecular and crystalline structure of a particular composition of matter shows a spectrum distinct from all other materials, which spectrum will change if the material under observation changes in its crystalline form. Since X-rays are of a wave-length comparable in their magnitude to the intermolecular spacings of a crystal the method of X-ray spectroscopy provides a means for the determination of the crystalline form and dimensions of a compound. Since the X-ray diffraction spectrum is characteristic for each compound a means is provided thereby for analyzing an unknown material and determining its composition. By the use of comparison standards, and by studying the relative intensities of certain spectral lines it is further possible to obtain a quantitative determination of any component of such a material.

One application of considerable commercial use is the study of the structure and properties of metals and alloys by the use of X-ray diffraction techniques. In metallurgical work the physical properties of alloys may be correlated directly with the diffraction spectrum, thus affording a rapid means for evaluating both the chemical composition and the crystalline structure of a sample of an alloy. For certain applications, however, the specimen must be subjected to a range of elevated temperatures in order to determine certain critical properties. In the preparation of steels for such special requirements as armor plate, for example, the metal must remain very hard and tough even at elevated temperatures. Consequently, a device which provides a means for studying the structure of such alloys at high temperatures is of great practical value to industry. The apparatus to be described in this specification was invented to meet such requirements.

In connection with the methods of X-ray spectroscopy it is necessary to refer to the specific types of apparatus which are in use. One method of obtaining an X-ray diffraction spectrum is to employ a photographic plate which is affixed around the specimen in such a manner as to be equidistant from it at all angles which are to be observed. The specimen is then subjected to radiation, and the photographic plate, when developed, will show a series of characteristic dark and light bands which may be correlated with the particular diffraction angles of the X-ray beam. Since X-rays darken a photographic plate in the same manner as does visible light an approximate evaluation of the relative radiation intensities at the several angles may be obtained by comparing the relative blackenings of the areas. The photographic means of obtaining X-ray diffraction patterns, however, is deficient in that it is both laborious and incapable of a high degree of accuracy. In order to correct these deficiencies a new device was described in Patent No. 2,386,785, issued on October 16, 1945, to Herbert Friedman on a Method and Means for Measuring X-ray Diffraction Patterns. This apparatus combined an X-ray source with a Geiger-Mueller counter and recording circuit so arranged that the counter tube would be rotated automatically at a fixed rate around the specimen and would record the intensity of radiations at each angular position. The invention described herein is a device for use in conjunction with the aforementioned means for measurement of X-ray diffraction patterns by the use of a Geiger-Müeller counter tube, although it is to be understood that its use in this particular embodiment is only exemplary and is not to be construed as limiting the scope of the invention.

Accordingly our invention comprises an apparatus for heating a specimen for X-ray diffraction analysis, such apparatus having a chamber wherein the specimen may be placed and maintained at an accurately controlled temperature under low pressure conditions and while subjected to X-rays which are permitted to enter the specimen holder and to be diffracted from the specimen by means of radiation permeable windows.

Our invention will be better understood by reference to the following drawings wherein:

Figure 2 is a view, partly in section and partly in elevation, of a specimen holder, its mount, and an automatic driving apparatus, taken along the line 2—2 of Figure 1;

Figure 3 is a cross sectional diagram of the specimen holder, taken along the line 3—3 of Figure 4;

Figure 4 is a longitudinal cross sectional diagram of the specimen holder taken along the line 4—4 of Figure 1;

Figure 5 is a preferred embodiment of a compact heating unit and specimen mount in flat grid form, and Figures 6 and 7 show horizontal and vertical views, partly in section and partly in elevation of a preferred embodiment of a specimen holder using the heating unit shown in Figure 5.

Figure 1:
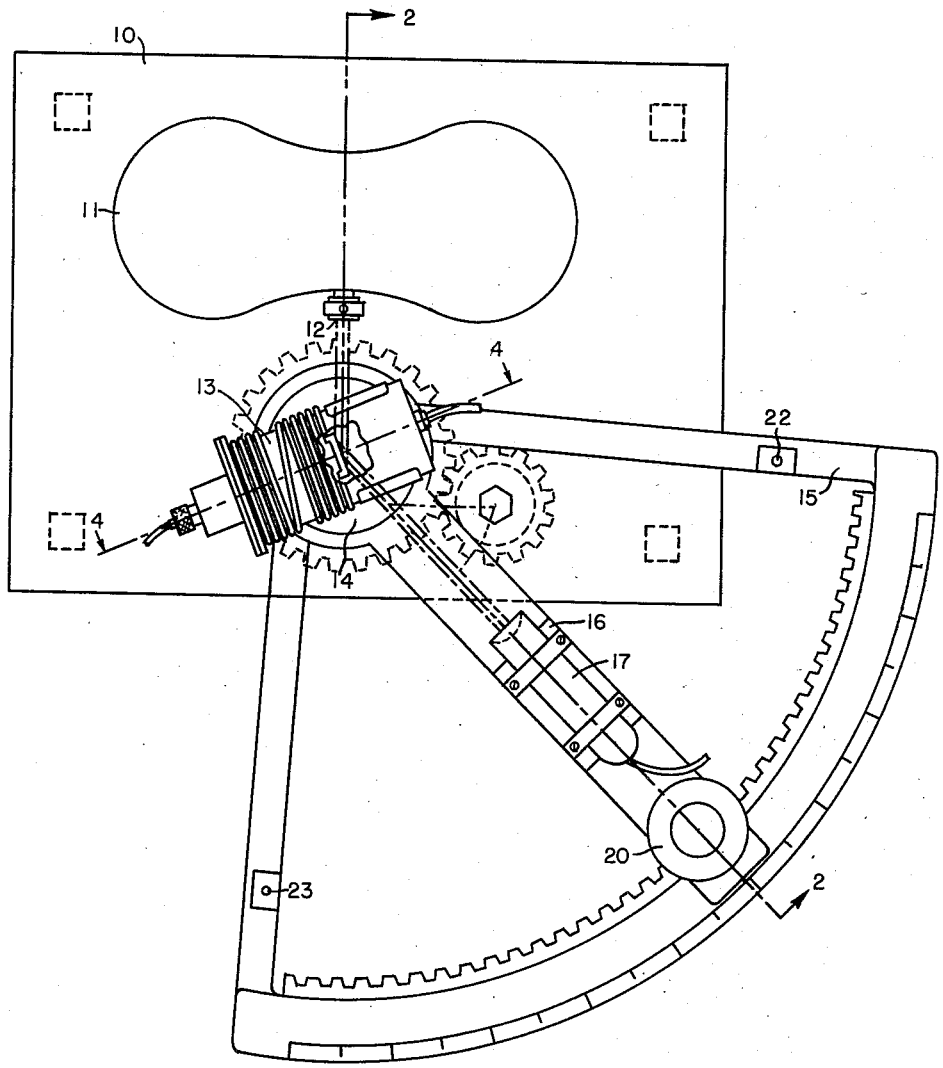
Figure 1 is a top view of an X-ray spectrometer, showing the installation of a specimen holding apparatus.

Referring to the apparatus shown in Figure 1, which shows the essential parts of an X-ray spectrometer, 10 represents the base plate upon which is mounted a shielded X-ray source 11 from which radiation is emitted through aperture 12. The invention described in this specification is a specimen holder 13, supported by mount 14. Frame 15 supports the detector assembly and provides an approximate angular scale for measuring the diffraction angles. Upon the base 16 is mounted a Geiger-Müeller counter tube 17. The small motor 20 can drive the detector assembly at a fixed rate along the scale frame.

In Figure 2, motor 20 in driving the detector assembly actuates gear train 21 to rotate specimen holder 13 at a fixed ratio to the movement of the detector assembly, thus effecting scanning of the spectrum of the sample. Switches 22 and 23 (as seen in Fig. 1) automatically stop movement of the detector assembly at the end of its travel.

Figures 3 and 4 are a series of cutaway and cross sectional views of a particular embodiment of the invention, and the corresponding parts are numbered accordingly.

Figure 3 shows the speciment 30, preferably powdered, embedded by pressure into the face of plate 31, which is then fastened in place with the screws 32 and 33. Concentrically surrounding the heater unit is cylinder 34, held in place by four sets of lugs such as lug 35. Windows in this cylinder provide access by the X-ray beam to the sample. Cylinder 36 serves as a mounting and support for the whole assembly, and carries aluminum or beryllium windows 37 and 38, sealed on vacuum tight. Cooling coils 39 surround cylinder 36 to carry off excess heat.

Continuing on into Figure 4, the assembly 40 to which plate 31 is attached, concentrically surrounds heating element 41, comprising several turns of tungsten on Nichrome wire, one side of which coil is grounded, the other being connected by a lead to external contact 42. Located concentrically within the heating element is the thermocouple, whose junction 43 is located immediately back of and touching the plate 31. The thermocouple junction is connected by leads to external terminals 44 and 45 respectively, and thence to a standard indicating and controlling circuit which controls the input to the heating element. The entire heating assembly is held in position by supporting cylinder 46, which is provided with circular fins 47, 48, and 49 to prevent radiation of heat away from the specimen area. These are insulated from the supporting cylinder 46. The curved reflecting surface 50 is likewise designed to prevent heat loss from the specimen due to radiation. Cooling coils 39 on the exterior of the heating unit are provided so that water may be passed through them to cool the entire assembly. Radiation permeable windows 37 and 38 are made of thin beryllium or aluminum and provide a path for the incident and refracted radiation over an angle of approximately 45 degrees on each side of the specimen. The entire unit is constructed so that it may be connected through opening 51 to a vacuum pump or diffusion pump, and the device is capable of maintaining an internal pressure of $10^{-3}$ mm. of mercury. By removing the screws at the flange of the outer shell 36 of the device, the entire heating unit with its supporting cylinder and fins may be removed to gain access to the sample.

In Figure 5 a preferred form of heater is shown, in which a grooved ceramic form 53 of thoria, zirconia, or other refractory material is fitted with a tungsten or Nichrome heater 54 in grid shape. Carbon plate 55 covers this heater and ceramic form and serves as a heat transfer agent to the sample 56. Four screws, such as those at 57 and 58, hold the assembly together.

Figures 6 and 7 are a horizontal section and a vertical view, partly in section and partly in elevation, respectively, of a specimen holder in which the heater of Figure 5 is mounted. Cylinder 60 supports the heater and its input leads and functions as a heat radiation reflector. Windows 61 and 62, of nickel or aluminum, admit X-rays to the sample 55. The chamber 63 is vacuum-tight, and has beryllium windows 64 and 65 to admit X-rays to the sample. Opening 66 is a means of evacuating the chamber.

A thermocouple 70 is mounted directly on the surface of the sample, as Figure 7 shows, and from it leads make external connections at 71. Contacts for leads to the heater input are located at the same place. Fins 72 cool the chamber 63, which is mounted on the spectrometer table and rotated at a fixed ratio to the rotation of the detecting apparatus.

The equipment, as described herein, is intended for use at specimen temperatures of up to 1000° C., and with thermostatic control it may be maintained at any temperature up to 1000° C. A considerable range of modifications may be made in the particular construction of the heating unit. The specimen may likewise be heated through induction heating rather than through the use of a thermal resistance.

Modifications of our invention other than as described in the foregoing embodiment will be readily apparent to those skilled in the art and are included within the invention as defined in the appended claims.

The invention described herein may be manufactured and used by or for the Government of the United States of America for governmental purposes without the payment of any royalties thereon or therefor.

What we claim and desire to secure by Letters Patent of the United States is:

An apparatus for high temperature X-ray diffraction analysis of a specimen comprising a hollow member forming a gas-tight chamber, a hollow cylindrical heat reflecting shield positioned within said chamber, axially aligned X-ray permeable windows disposed in the walls of said member and said shield to permit X-ray to enter and leave the chamber and the hollow cylindrical shield substantially without attenuation or distortion, specimen mounting means positioned within the shield to locate the specimen therein so that an appreciable surface area of the specimen is exposed to incident X-rays entering through the windows, said specimen mounting means comprising a plate positioned within the hollow cylindrical shield substantially perpendicular to the wall thereof with one surface thereof exposed to the X-rays and means supporting the specimen on said one surface with the specimen occupying an appreciable area of said one surface, electrical heating means positioned on the other side of said plate in conductive heat transferring relation therewith to transfer heat generated by the heating means substantially uniformly to all parts of the specimen and means determining the temperature of the specimen comprising a thermocouple having heat insulated leads positioned on the other side of the plate in diametric relation to the specimen.

HERBERT FRIEDMAN.
LA VERNE S. BIRKS.

REFERENCES CITED

The following references are of record in the file of this patent:

UNITED STATES PATENTS

| Number | Name | Date |
| --- | --- | --- |
| 1,053,280 | Copeman | Feb. 18, 1913 |
| 1,260,252 | Apfel | Mar. 19, 1918 |
| 1,324,156 | Jacoviello | Dec. 9, 1919 |
| 1,680,010 | Brand | Aug. 7, 1928 |
| 2,177,173 | Dadson | Oct. 24, 1939 |

OTHER REFERENCES

"A High-Temperature X-Ray Camera for Precision Measurements," by A. H. Jay, Proc. Phys. Soc. (London), vol. 45, 1933, pp. 635–642.

"A Variable Temperature X-Ray Powder Camera," by W. H. Barnes and W. F. Hampton, Rev. Sci. Instr., vol. 6, Nov. 1935, pp. 342–344.

Journal of Applied Physics, "High Temperature X-Ray Camera," vol. 14, March 1943.